Aug. 25, 1970 D. H. WILLIS 3,525,801
SERVICE AID FOR COLOR TELEVISION RECEIVER
Filed June 5, 1967
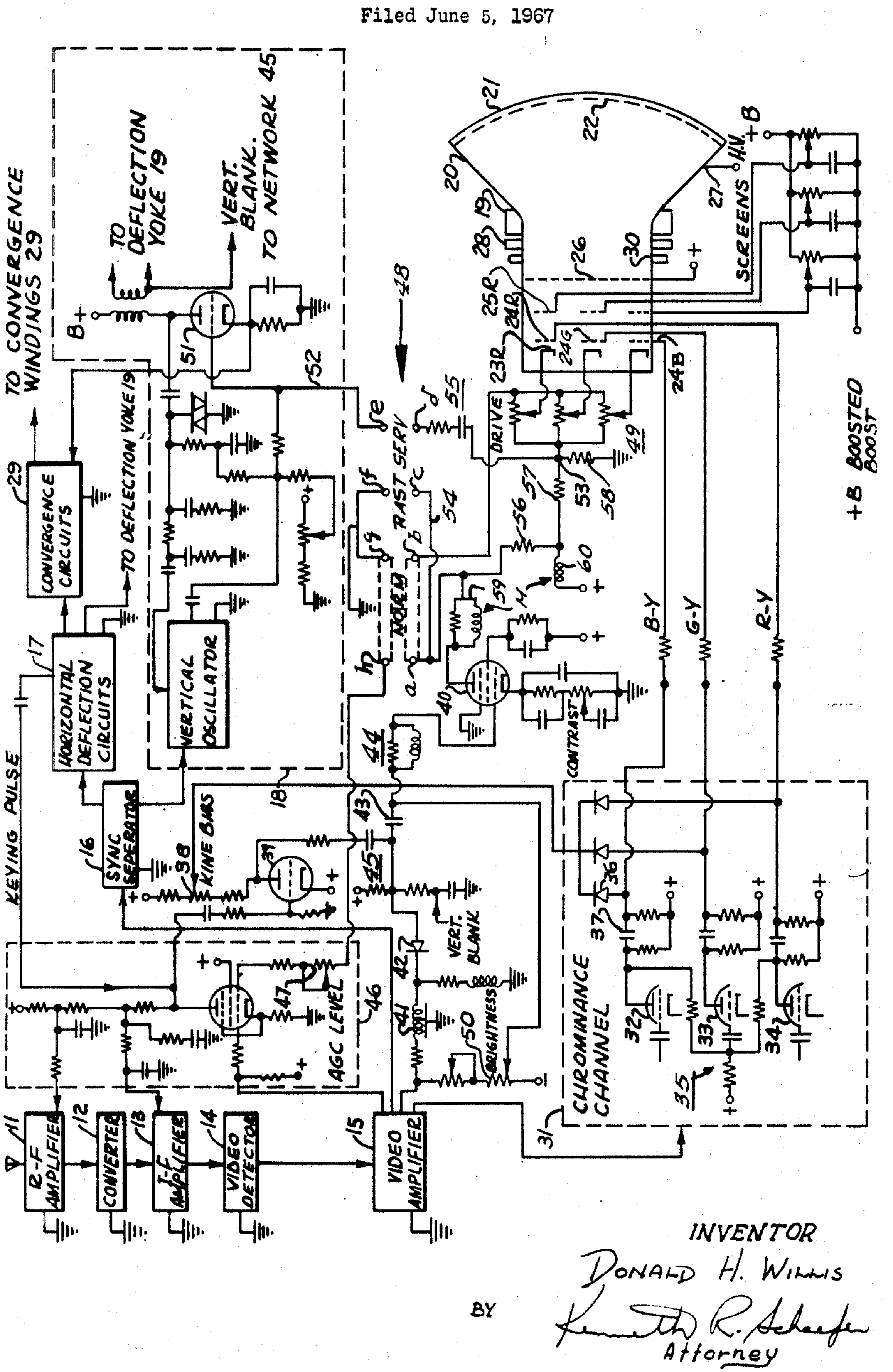
INVENTOR
DONALD H. WILLIS
BY Kenneth R. Schaefer
Attorney // United States Patent Office 3,525,801

Patented Aug. 25, 1970

3,525,801
SERVICE AID FOR COLOR TELEVISION RECEIVER

Donald H. Willis, Indianapolis, Ind., assignor to RCA Corporation, a corporation of Delaware Filed June 5, 1967, Ser. No. 643,433
Int. Cl. H04n 5/44
U.S. Cl. 178—5.4 6 Claims

ABSTRACT OF THE DISCLOSURE

A color television receiver servicing or "set-up" system comprising a three position switch for selectively coupling to the cathodes of a color television receiver (1) normal luminance signal information including blanking signals, (2) a luminance signal of controllable brightness level devoid of picture information for providing a blank raster for purity checking and adjustment and (3) a reference voltage level in combination with horizontal blanking signals for providing, upon deactivation of vertical deflection circuits, a single horizontal line devoid of picture information for permitting color temperature adjustment.

This invention relates to color television receivers, and more particularly to apparatus for facilitating the servicing and set-up of a color kinescope therein.

In color television receivers of the type employing a multi-gun color kinescope such as the well known three gun shadow mask color kinescope, a plurality of circuit controls are provided and a number of adjustments of such controls as well as adjustments of the electromagnetic deflection yoke associated with the color kinescope are required in order to obtain faithful reproduction of color images.

To provide optimum operation of the color kinescope, the controls associated with the kinescope are adjusted in accordance with what is commonly referred to as a set-up procedure. A first adjustment which is required is generally referred to as the "purity" adjustment. As used in connection with adjusting a three color kinescope, the term purity relates to the degree of freedom of one color from dilution by one or both of the other two colors. The purity adjustment is accomplished by positioning of the electromagnetic deflection yoke and adjustment of the purity magnet assembly so as to locate the deflection center of the three electron beams to restrict each of such beams to impinge substantially upon only a single predetermined one of the three phosphors arranged on the kinescope screen.

The set-up procedure is further directed towards making color temperature adjustments, taking into account the differences in the cathode emission of the several guns, and differences in the efficiencies of the several phosphors. That is, it is desired that the color kinescope reproduce desired colors at all points on the phosphor screen and furthermore that it reproduce white information with the proper color temperature at all brightness levels between minimum and maximum white, with the maximum white level being produced at the highest achievable level of brightness consistent with good image clarity.

In one portion of a widely used color temperature set-up procedure for color kinescopes, the vertical deflection circuits are disabled, a common reference bias potential is applied in place of the luminance channel output to the cathodes of all the electron guns, and the bias on the screen grid of each gun is gradually increased until that gun produces a barely visible trace on the kinescope. Since the vertical deflection circuits are disabled, each electron gun will light those of its associated color phosphor dots lying along a relatively narrow horizontal line across the center of the kinescope. When all three guns have been so energized, the line will appear, from a suitable distance, as a white line of low brightness level. It is desirable in following the above procedure to have the electron guns turned off (i.e., blanked) during the retrace portion of each horizontal scanning interval. If such blanking is not provided, color retrace lines which vary in brightness level from one side of the screen to the other will appear adjacent to or overlapping the faint reference line, thereby interfering with the set-up procedure (brightness changes and convergence errors are associated with the retrace lines because of the non-linear nature of the retrace waveforms).

In a receiver where horizontal blanking is normally supplied to the kinescope via the luminance channel, the step in the above-described procedure requiring disconnecting the luminance channel and substituting a reference potential also serves to disconnect the desired blanking signal.

The present invention is directed to servicing aids for facilitating the above-mentioned set-up adjustments in such a color television receiver while providing the desired horizontal retrace blanking.

In accordance with the invention, switching apparatus is incorporated in the receiver to selectively switch the receiver to a normal operating condition, to a service condition for permitting adjustment of the electron guns of the kinescope, and to a purity adjustment condition for facilitating final location and adjustment of the deflection yoke and purity magnet assemblies. By use of such switching apparatus, proper set-up adjustments may be achieved at any time without concern for the nature of the program material available and with an accuracy difficult to match by set-up procedures effected with reliance on the display of broadcast program material. In the service condition, means are provided for coupling both horizontal blanking signals and a reference potential to the electron guns of the color kinescope to facilitate color temperature adjustment.

Accordingly, it is an object of the present invention to provide novel and improved color television receiver apparatus for facilitating the adjustment and set-up of the color kinescope.

The novel features that are considered characteristic of this invention are set forth with particularity in the appended claims. The invention itself, however, both as to its organization and method of operation as well as additional objects thereof will best be understood from the following description when read in connection with the accompanying drawing.

In the drawing, a color television receiver is illustrated which comprises the usual front end structure including an R-F amplifier 11, a converter 12, an I-F amplifier 13, and a video detector 14. The conventional sound reproducing system forms no part of the present invention and is therefore not shown. The detected composite color television signal output of the video detector 14 is applied to a video amplifier 15 including one or more stages of amplification and having a plurality of separate outputs. One of the outputs of video amplifier 15 is applied to a sync separator 16 for recovery of the deflection synchronizing components of the composite signal, which synchronizing components are applied to horizontal and vertical deflection circuits 17 and 18, respectively. The deflection circuits serve to develop suitable deflection waveforms for energizing respective horizontal and vertical windings of a deflection yoke 19. The deflection yoke 19 is provided to effect suitable deflection of the three electron beams of a three gun shadow mask color kinescope 20 which serves as the color image reproducer of the receiver.

The color kinescope 20 incorporates a phosphor screen 21 made up of a pattern of triads of red, blue, and green light-emitting phosphors. A multi-apertured shadow mask 22 is interposed in the path of electrons between the electron gun structure of kinescope 20 and the phosphor screen 21. The angle of approach of an individual electron beam to an aperture in the mask determines which of the phosphors of a respective associated triad will be energized to cause light emission.

The electron gun structure of the color kinescope 20 comprises three separate electron guns arranged to produce respective beams which on proper adjustment of the deflection yoke 19 approach the mask at respectively different angles so as to selectively cause light emission only from respective ones of the triad phosphors. Thus, the electron gun which produces the beam that strikes only the red emitting phosphor of each triad on the screen 21 may be designated as the red electron gun, etc. The red electron gun of color kinescope 20 includes a cathode 23R, a control grid 24R and a screen grid 25R, the latter serving as a first accelerating electrode. The blue and green electron guns comprise similar elements. A commonly energized focus electrode structure 26 is associated with each of the three electron guns. Color kinescope 20 further includes an ultor electrode 27 energized at a high voltage level to supply the final acceleration to the electron beams.

To insure proper convergence of the three beams at the apertured mask 22, a convergence assembly 28 is associated with color kinescope 20 and is energized with suitable dynamic waveforms derived by convergence circuits 29 from waveforms developed in the deflection circuits 17 and 18.

A purity adjustment ring and blue lateral magnet assembly 30 is positioned on the neck of color kinescope 20, the purity ring serving to modify the magnetic field in kinescope 20 for setting purity at the center of phosphor screen 21. Details of the construction and mode of operation of assembly 30 are contained in RCA Victor Color Television Service Data, File 1965, No. T–13, published by RCA Sales Corporation, 600 N. Sherman Drive, Indianapolis, Ind. 46201.

A second output of the video amplifier 15 is supplied to a chrominance channel 31, which conventionally includes suitable apparatus for selecting the modulated color subcarrier component of the composite signal, amplifying the selected signal component, and synchronously detecting or demodulating the color-representative signals from the amplified, modulated color subcarrier component. Associated with the color subcarrier detecting apparatus of the chrominance channel 31 is a local source of reference oscillations of color subcarrier frequency suitably synchronized in accordance with the color synchronizing component of the composite signal for achieving the desired synchronous detection. The chrominance channel 31 includes suitable matrixing apparatus for combining the detected outputs to achieve production of desired color difference signals (e.g., R—Y, G—Y, B—Y). A portion of the matrixing apparatus is shown and comprises first, second and third color difference amplifiers 32, 33 and 34 (grid biasing elements are not shown). The detected color-representative signals (e.g., X and Z) are respectively capacitively coupled to the first (R—Y) amplifier 32 and the third (B—Y) amplifier 34. A third color difference signal (G—Y) is derived by means of a resistive network 35 coupled to the outputs of amplifiers 32 and 34. The outputs of amplifiers 32, 33 and 34 are respectively capacitively coupled to the control grids (e.g., 24R, 24G, 24B) of kinescope 20. Because of the capacitive (i.e., A-C) coupling utilized in chrominance channel 31, kinescope 20 does not respond to variations in direct voltage levels within channel 31 (and particularly to those direct voltage variations occuring at the outputs of amplifiers 32, 33 and 34). Only the alternating components of the output waveforms of amplifiers 32, 33 and 34 reach the control grids 24R, 24G, 24B of kinescope 20. A reference operating voltage level is established for each of control grids 24R, 24G, 24B by means of three identical diode clamping circuits. Considering the clamping circuit associated with amplifier 32, that circuit comprises a diode 36 having one electrode coupled to the junction of a capacitor 37 and control grid 24B and the other electrode coupled to a variable resistance "KINE BIAS" control 38. Bias control 38 forms a part of the output (plate) load of a horizontal blanking stage 39. Blanking stage 39 is rendered conductive during each horizontal retrace interval by means of a keying pulse supplied by horizontal deflection circuits 17. During each horizontal retrace interval, a voltage determined by the setting of bias control 38 is applied to diode 36 (as well as to the additional clamp diodes).

If the voltage at any control grid (e.g., 24R) has changed from its nominal value during the previous horizontal scanning interval, the coupling capacitor (e.g., 37) is charged so as to re-establish the desired voltage at the control grid (24R). The required difference in voltage level between control grid (24) of kinescope 20 and output electrode (anode) of a matrix amplifier (32) is therefore maintained. Proper color temperature is therefore maintained.

Another output of video amplifier 15 is applied to the control electrode of a luminance amplifier 40 using a coupling circuit which includes a luminance delay line 41, a blanking diode 42, a capacitor 43 and a peaking network 44. The amplified luminance signal output of amplifier 40 is applied to the cathode electrode (e.g., 23R) of the electron gun structure of color kinescope 20 in a manner to be explained more fully below. The blanking diode 42 is biased by means of a network 45 for conduction during the normal scanning interval of each horizontal line and is biased to a non-conductive state during each horizontal and vertical retrace interval. There is therefore no luminance information supplied during such intervals and kinescope 20 is driven to a black condition. Vertical blanking signals are supplied from the output stage of vertical deflection circuit 18 while horizontal blanking signals are supplied by means of blanker stage 39. Further details of operation of the blanking circuit shown are contained in my copending U.S. patent application Ser. No. 543,130, filed Apr. 18, 1966, entitled "Blanking Circuits for Television Receivers" and assigned to the same assignee as the present invention.

Another output of video amplifier 15 is applied to the control electrode of a keyed automatic gain control stage 46. A keying pulse is also applied to AGC stage 46 from the output of horizontal deflection circuit 17. The derived AGC signal is applied to both R-F amplifier 11 and I-F amplifier 13 to control the gains thereof. An AGC LEVEL control 47 is provided to control the grid bias and therefore the operating level of AGC stage 46.

Details of typical circuits for performing additional functions of the portions of the television receiver shown in block diagram or other simplified form may be found by referring to RCA Victor Color Television Service Data, File 1966, No. T–19, for the RCA Victor color television chassis CTC–24 series.

In effecting proper operation of the color kinescope 20, certain problems arise which are complicated by the multiple gun, multiple phosphor nature of the reproducer. For example, differences in the cut-off characteristics of the three guns, differences in the emission characteristics of the cathodes of the three guns, and differences in efficiencies of the three types of phosphors require that several parameters be adjusted in order to provide proper color and black and white images on the phosphor screen 21. To facilitate such adjustment, a "service switch" 48 is provided in the television receiver. Service switch 48 may be positioned in any one of the three positions marked, as is shown the drawing, "NORM," "RAST," or "SERV."

The first position is utilized under normal operation to couple the output of luminance amplifier 40 via contacts *a* and *b* and the lower blade (as is shown in the drawing) of switch 48 to the cathodes of color kinescope 20 via adjustable red, green and blue "DRIVE" controls 49.

Furthermore, at the "NORM" position, the upper blade of switch 48 serves to couple one end of adjustable resistance "AGC LEVEL" control 47 to ground via contacts *h* and *g* to provide an adjustable input (grid to cathode) bias for AGC stage 46. The position at which the wiper arm of control 47 is set determines the voltage level at which AGC stage 46 conducts to initiate automatic gain control of the R-F amplifier 11 and the I-F amplifier 13.

The service switch 48 is provided with a second position labelled "RAST" to facilitate checking and final adjustment of the position of deflection yoke 19 and purity ring assembly 30 to achieve the desired color purity of the image produced on phosphor screen 21.

It is desirable, when checking and making final adjustments for color purity, to provide a static (non-changing) display having substantial areas of equal brightness on the phosphor screen 21 of kinescope 20. It is particularly desirable to have a reasonably bright static area at the center of screen 21 to be able to ascertain that purity ring assembly 30 is properly adjusted. While a broadcast test pattern may be utilized for purity checking, this type of broadcast material normally is not available during a major portion of the day. Therefore, a blank raster (i.e., no image) of substantially uniform brightness is produced upon screen 21 when service switch 48 is placed in the "RAST" position. The entire received composite television signal including luminance, chromnance, sound and synchronization components is prevented from reaching ultimate utilization devices in the receiver in the following manner. When switch 48 is placed in the "RAST" position, the contacts *f* and *g* are coupled together to ground and serve no function. At the same time, since the upper blade of switch 48 rests between the contacts *f* and *g*, AGC LEVEL control 47 is not returned to ground. As a result, AGC stage 46 is driven into heavy conduction. The plate voltage of AGC stage 46 drops sufficiently to apply an AGC effect to amplifiers 11 and 13 to completely cut off such amplifiers. No signal passes through either R-F amplifier 11 or I-F amplifier 13 under these conditions. The outputs of chrominance channel 31 and luminance amplifier 40 therefore remain substantially fixed and devoid of broadcast program material when switch 48 is placed in the "RAST" position.

The deflection circuits 17 and 18 continue to operate and provide desired retrace blanking signals to blanking diode 42. Luminance amplifier 40 provides substantially constant drive signals to all three cathodes of kinescope 20, the levels of such drive signals and therefore brightness of the raster being controllable by means of the brightness variable resistor 50 coupled to the control grid of luminance amplifier 40.

In accordance with the usual purity adjustment procedure, the blue and green electron guns are adjusted to cut-off (e.g., turn blue and green screen controls to minimum position to extinguish blue and green beams). Assuming center convergence to be correctly adjusted, the entire phosphor screen 21 should appear as a substantially uniform red. If there is any variation from the desired uniform red, purity magnet assembly 30 may be adjusted to obtain uniform red in the center of screen 21 and then deflection yoke 19 may be positioned along the neck of kinescope 20 in the standard manner to obtain the desired overall uniform red field on phosphor screen 21. If necessary, the brightness of the red field may be adjusted for convenience of observation by means of brightness control 50.

Upon completion of the final purity adjustment, service switch 48 then may be placed in the "SERV" position for readjustment of the blue and green screen controls for proper color temperature as will be explained below.

The service switch 48 then may be returned to the "RAST" position to check the gray scale "tracking" of the color temperature as brightness control 50 is varied over its entire range. The switch 48 then may be returned to its "NORM" position for normal operation of the receiver.

It should be noted that provisions of the "RAST" function on switch 48, in addition to permitting simple purity adjustments when required also permits a rapid, simple means for checking purity in diagnosing and isolating service problems in the receiver.

The third or "SERV" position of service switch 48 is utilized for adjustment of the operating characteristics, i.e., "KINE BIAS" and screen potentials of the three electron guns associated with color kinescope 20. When the switch 48 is plaecd in the "SERV" position the vertical deflection circuit 18 is disabled, i.e., the grid of the vertical output stage 51 is connected to ground by means of conductor 52, terminal *e*, the upper blade of switch 48 and terminal *f*. A horizontal line is therefore produced across the middle of phosphor screen 21. At the same time, the ground applied via contacts *g* and *h* to AGC LEVEL control 47 in the "NORM" position of switch 48 is removed, causing AGC stage 46 to conduct heavily as occurred in connection with the "RAST" position operation described above. R-F amplifier 11 and I-F amplifier 13 are therefore cut off removing video and chrominance signals from their respective channels and therefore from kinescope 20. Since contact *b* of switch 48 is disconnected from the circuit when switch 48 is in the "SERV" position, one end of "DRIVE" controls 49 is floating, thereby permitting application to the cathodes of color kinescope 20 of a fixed direct voltage developed at terminal 53 in the voltage divider comprising essentially inductance 60, resistor 57 and resistor 58.

The voltage provided at terminal 53 is selected substantially equal to the voltage which normally is applied to the cathodes of kinescope 20 when luminance amplifier 40 commences conduction in the presence of luminance signal information. As noted above, because of the action of AGC stage 46, there is at this time no luminance signal information supplied to amplifier 40. The kinescope operating potentials therefore may be adjusted to provide the proper color temperature without interference from broadcast program material.

Although horizontal blanking signals are applied to the input of amplifier 40 at this time, such blanking signals produce substantially no effect at the junction of resistor 56 and inductor 60 (i.e., inductor 60 appears substantially as a short circuit at the blanking frequencies). However, horizontal blanking signals are available at the junction of resistor 56 and network 59.

In accordance with one aspect of the present invention, with switch 48 in the "SERV" position, in addition to the fixed reference voltage applied at junction 53 to the "DRIVE" controls 49, horizontal blanking pulses are also provided to the cathodes (e.g., 23R) of kinescope 20. The horizontal blanking pulses are coupled from the output of luminance amplifier 40 via jumper connection 54 to terminal *c* of switch 48. In the "SERV" position, the lower blade of switch 48 couples terminal *c* to terminal *d*. A resistance-capacitance coupling network 55 is provided to couple the blanking pulses, while blocking the direct anode potential of amplifier 40, to junction 53 and thus to the cathodes of kinescope 20.

The blanking pulses are superimposed upon the reference voltage provided at terminal 53. The ends of "DRIVE" controls 49 coupled to terminal *b* are open-circuited and the settings thereof have no effect on the amplitude of either the blanking signals or the reference voltage applied to the cathodes of kinescope 20. The magnitude of the blanking signals can be varied by adjustment of brightness control 50. In order to minimize the effect of the blanking signals on the reference voltage level provided at junction 53, the value of the resistance utilized in coupling network 55 is selected so as to provide a desirable retrace blanking pulse level when brightness control 50 is adjusted to maximum level.

In practice, because of the effect of the retrace waveforms on convergence circuits 29, it has been found that if horizontal retrace lines are present when switch 48 is placed in the "SERV" position, one retrace line (i.e., one color of the red, green, blue trio) may be above the trace line, another may be below and the third may fall along the trace line. Other positions of the retrace lines may also be observed according to particular conditions of a given receiver. In any event, such retrace lines are undesirable during color temperature adjustments and can result in incorrect settings of the screen controls.

Further details of the manner in which color temperature adjustments may be made in a receiver of the general type described above are contained in the above-referenced RCA Victor Service Data, File 1966, No. T–19.

What is claimed is:

1. In a color television receiver including a color image reproducing kinescope having plural color producing electron beam apparatus, deflection means associated with said electron beam apparatus for producing respective horizontal and vertical scanning of said kinescope, means for receiving and amplifying composite television signals, means coupled to said amplifying means for deriving from said composite television signals separate image synchronizing, luminance and chrominance-representative components, and means subject to synchronization by said synchronizing components for providing image blanking components, control apparatus comprising:

luminance amplifying means for amplifying both said blanking and luminance components, switching means having a first position for coupling said luminance amplifying means to said kinescope to provide amplified luminance and blanking components to said kinescope during normal operation, and at least one additional position for coupling only said amplified blanking component from said luminance amplifying means to said kinescope while excluding said luminance component, substituting for said luminance component a substantially fixed reference voltage and simultaneously disabling operation of said deflection means in the vertical scanning direction, whereby color temperature adjustment of said kinescope is performed without interference from broadcast material or undesirable scanning retrace lines.

2. In a color television receiver including a color image reproducing kinescope having plural color producing electron beam apparatus, deflection means associated with said electron beam apparatus for producing repetitive horizontal and vertical scanning of said kinescope, means for receiving and amplifying composite television signals, means coupled to said amplifying means for deriving from said composite television signals separate image synchronizing, luminance and chrominance-representative components, means subject to synchronization by said synchronizing components for providing image blanking components, and luminance amplifying means for amplifying both said blanking and luminance components, control apparatus comprising:

switching means having a first position for coupling said luminance amplifying means to said kinescope to provide luminance and blanking components to said kinescope during normal operation, at least one additional position for coupling only said blanking component from said luminance amplifying means to said kinescope while excluding said luminance component, substituting for said luminance component a reference voltage and simultaneously disabling operation of said deflection means in the vertical scanning direction, and blocking network means coupled to said additional switch position for coupling from said luminance amplifying means to said kinescope only alternating signal components while excluding direct signal components, whereby color temperature adjustment of said kinescope is performed without interference from broadcast material or undesirable scanning retrace lines.

3. Apparatus according to claim 2 wherein said blocking network means comprises a capacitor.

4. Apparatus according to claim 3 wherein said blocking network means further comprises a limiting resistor.

5. In a color television receiver including a color image reproducing kinescope having plural color producing electron beam apparatus, deflection means associated with said electron beam apparatus for producing repetitive horizontal and vertical scanning of said kinescope, means for receiving and amplifying composite television signals, means coupled to said amplifying means for deriving from said composite television signals separate image synchronizing, luminance and chrominance-representative components, means subject to synchronization by said synchronizing components for providing image blanking components, and luminance amplifying means for amplifying both said blanking and luminance components, control apparatus comprising:

switching means having a first position for coupling said luminance amplifying means to said kinescope to provide luminance and blanking components to said kinescope during normal operation, at least one additional position for coupling only said blanking component from said luminance amplifying means to said kinescope while excluding said luminance component, substituting for said luminance component a reference voltage and simultaneously disabling operation of said deflection means in the vertical scanning direction, automatic gain control means coupled to said receiving and amplifying means for controlling the gain thereof in accordance with received signal levels, said first position of said switching means selectively placing said gain control means in a normal signal-level responsive condition for controlling the gain of said receiving and amplifying means for normal operation of said receiver, said additional position of said switching means being arranged for placing said gain control means in a substantially fixed output operating condition for maintaining said receiving and amplifying means in cutoff condition for all received signal levels, whereby color temperature adjustment of said kinescope is performed without interference from broadcast material or undesirable scanning retrace lines and said luminance and chrominance representative components are not derived from said composite television signals.

6. Apparatus according to claim 5 wherein said switching means comprises a further position for coupling said luminance amplifying means to said kinescope to provide thereto blanking components, simultaneously maintaining said deflection means in scanning condition and maintaining said gain control means in said substantially fixed output operating condition to permit purity adjustment.

References Cited

UNITED STATES PATENTS

| | | | |
|---|---|---|---|
| 3,114,796 | 12/1963 | Stark et al. | 178—5.4 |
| 3,419,673 | 12/1968 | Swaine | 178—5.4 |

RICHARD MURRAY, Primary Examiner

A. H. EDDLEMAN, Assistant Examiner